United States Patent [19]

Ive

[11] Patent Number: 5,586,351

[45] Date of Patent: Dec. 24, 1996

[54] INFANT SUPPORT PAD WITH ADJUSTABLE PILLOW

[76] Inventor: Ronald A. Ive, 12848 W. Ellsworth Pl., Lakewood, Colo. 80228

[21] Appl. No.: 399,911

[22] Filed: Mar. 7, 1995

[51] Int. Cl.⁶ .............................. A47D 15/00; A47G 9/00
[52] U.S. Cl. .................. 5/655; 297/219.12; 297/397; 5/632
[58] Field of Search ................... 5/655, 417, 419, 5/420, 424, 636, 637, 630, 632; 297/219.12, 397; D6/601

[56] References Cited

U.S. PATENT DOCUMENTS

| | | | |
|---|---|---|---|
| D. 328,683 | 8/1992 | Kalozdi | 5/655 |
| 1,967,067 | 7/1934 | Rightmire . | |
| 2,644,173 | 7/1953 | James . | |
| 3,165,355 | 1/1965 | Hitchcok, Jr. et al. | 297/216 |
| 3,366,294 | 1/1968 | Stephenson | 224/29 |
| 4,173,048 | 11/1979 | Varaney | 5/494 |
| 4,383,713 | 5/1983 | Roston | 297/219 |
| 4,434,513 | 3/1984 | Welch | 5/425 |
| 4,779,930 | 10/1988 | Rosen | 297/397 |
| 5,383,711 | 1/1995 | Houghteling | 297/397 |

OTHER PUBLICATIONS

"Baby Head Support" manufactured by Diplomat Juvenile Corp. 25 Kay Fries Drive, Stoney Point, New York 10980; sold by Diplomat.

"Soft Seat", by NoJo (Noel Joanna, Inc.).

"Comfy Head Support:", manufactured by Kalencom Corporation, 740 Clouet Street, New Orleans, LA 70117.

"Heads Up" by Gold Bug, 4999 Oakland Street, Denver, CO 80239.

Primary Examiner—Alexander Grosz
Attorney, Agent, or Firm—Timothy J. Martin; Michael R. Henson

[57] ABSTRACT

A support article is adapted to engage an infant's head, neck and shoulders in order to provide lateral stability to the infant's head and neck. The support article broadly comprises a pad having a first surface upon which the infant can be placed in a reposed position and an opposite second surface. An upstanding support pillow is secured to the pad and includes a central portion extending in an arcuate configuration around a region that is sized and adapted to receive the infant's head and a pair of end portions disposed on opposite ends of the central portion. The end portions project in laterally outward directions from one another to define should supports that are positioned against the infant's shoulders when the infant's head is received around the region. The central portion and the end portions provide stability to the head and neck during use. First and second pairs of cooperative fasteners may be provided so that the support article is adjustable in order to accommodate the size of the infant as he/she grows.

21 Claims, 4 Drawing Sheets

INFANT SUPPORT PAD WITH ADJUSTABLE PILLOW

FIELD OF INVENTION

The present invention is related to a support article which is adapted to be placed against a support such a car seat, infant carrier, stroller, swing, etc. More particularly, the present invention concerns a support article which is sized and adapted to engage an infant's head, neck and shoulders when the infant is in a reposed position in order to provide lateral stability to the infant's head and neck. The present invention is further directed to a support article which is adapted to adjust to the infant's head size to provide a comfortable, yet protective, support for the infant as the infant grows to a small child.

BACKGROUND OF THE INVENTION

Parents would undoubtedly agree that caring for an infant is quite a formidable task. Proper caretaking requires a parent to devote much time, effort and attention to an infant's needs, particularly during the early stages of life. The activities and demands of every day life often make it necessary, or more convenient, for small children to accompany their parents during excursions such as shopping, traveling or work, to name only a few. A major concern for parents during these times is to provide a comfortable surrounding for the child. Even more importantly, these accommodations need to be safe so that the child is less susceptible to injury. Numerous safety guidelines have, in fact, been implemented to ensure the infant is properly protected during travel.

Various infant carriers on the market today provide both comfort and safety. These include car seats, strollers and swings, among others. A problem with these carrier devices is that they sometimes do not provide adequate cushioning support for newborn infants or young children who require external additional support because the neck muscles have not yet developed to the point where they, alone, can support the infant's head to maintain it in an upright position.

In an effort to resolve this problem, various infant head support devices have been developed for use in conjunction with infant carriers. These devices generally employ a quilted pad which is sized to accommodate the infant. This quilted pad includes a cushioned support pillow attached to it in an upper region for providing support for the infant's head. Typically, these support pillows are elongated members formed of a resilient foam or fiber material. Many of these devices also are equipped with a mechanism on the back of the pad for securing the support device to the seat against which the infant rests. This mechanism is helpful in preventing unnecessary movement of the support device during travel.

The infant support devices discussed above, while functional in their own right, do have some disadvantages. For instance, some of these products have a support pillow which tapers in width as it proceeds from the top of the infant's head toward the neck and shoulder region, thereby providing sufficient support only for the head region. As a result, there are unsupported areas around the neck and shoulder region. While other devices do not incorporate tapered support pillows, they still provide little support the infant's neck because they are not designed engage this area; thus, there is no restraint to prevent the neck from moving laterally. The unfortunate result of this can be injury to the child. Another major disadvantage of these products is their inability to accommodate for the size of the infant's head as the infant grows. Rather, these are one size fits all products with limited lifetimes of use.

Therefore, a need exists to provide an improved infant support article which is better adapted to stabilize the infant's head therein. It is also advantageous to provide a support article which is capable of providing a cushioned support for the neck and shoulder region of the infant to better maintain the infant's head in an upright and stable position. There is a further need for such a support article to be adjustable in order to accommodate the size of the infant head as he/she grows. The present invention is particularly concerned with addressing these needs and advantages.

SUMMARY OF INVENTION

It is an object of the present invention to provide a new and useful infant head support device which can be placed on a support surface so that the infant may be comfortably reposed thereon with his/her maintained in an upright position.

It is another object of the present invention to provide a support device for an infant which is designed to protectively cushion a neck and shoulder region of the infant to better maintain the infant's head in an upright position during use.

Still another object of the present invention is to provide a head support device which is adjustable to provide a comfortable, yet protective support for the infant's head as he/she grows.

Yet another object of the present invention is to provide a head support device for an infant which is lightweight and sufficiently compact so that the device may be conveniently transported.

Still a further object of the present invention is to provide a head support device for an infant which is adapted for use with various seating structures such as car seats, infant carriers, strollers, swings, etc.

Accordingly, a support article of the present invention is hereinafter described. The support article is adapted to engage an infant's head, neck and shoulders in order to provide lateral stability to the infant's head and neck. In its broadest form, the support article includes a pad adapted to be positioned against a support and an upstanding support pillow. The pad has a first surface upon which the infant can be placed and a second surface opposite the first surface. It is preferred that the present invention also include a first pair of cooperative first and second fasteners and a second pair of cooperative first and second fasteners for releasably securing the support pillow to the pad at adjustable positions.

The pad has a longitudinal axis and includes a an almost circular curved as upper portion and a lower portion. The curved upper portion is defined by an upper peripheral edge which extends around the majority of a circle and the lower portion has a pair of lateral side edges parallel to the longitudinal axis. The upper peripheral edge extends in an arcuate manner to terminate at peripheral edge ends located laterally inward of the lateral side edges. The lateral side edges are connected to the upper peripheral edge by respective inwardly extending medial edges, each of which is formed at an obtuse angle with respect to its respective side edge. Thus, a pair of opposed V-shaped cut-outs are formed to define a medial portion of the pad which is of a reduced transverse dimension with respect to the upper and lower portions. It is preferred that the first and second surfaces of the pad be formed by bottom and top layers that are joined together by a seam and that have a quilted third layer located therebetween. It is also preferred that the lower portion of the pad be formed as a pair of spaced apart leg regions which are sized to accommodate the infant's legs.

An upstanding support pillow is disposed along the upper peripheral edge of the pad and includes a central portion which extends in an arcuate configuration around a region that is sized and adapted to receive the infant's head when the infant is in the reposed position. The support pillow also includes a pair of end portions which are disposed on opposed ends of the central portion, proximate to the medial portion, and project in laterally outward directions from one another to define shoulder supports which are adapted to be positioned against the infant's shoulders when the infant is received within the region. Thus, it may be appreciated that the combination of the central portion and the end portions provide stability to the head and neck of the infant by resisting lateral movement of the infant when the infant is in the reposed position. A hinge structure is located in a spaced relation to the respective ends of the support pillow and the central portion. These hinged structures can be formed by affixing opposite sides of the support pillow together along hinge lines. Preferably, the support pillow is an elongated tubular member formed of a flame retardant material, such as a polyester fiber or polyurethane foam, and is encased by fabric. Also, the support pillow has a substantially unformed height relative to the pad.

The support article according to the present invention may also be adapted to engage an infant's head, neck and shoulders in an adjustable manner to thereby provide lateral stability to the infant's head and neck as the infant grows. As such, the central portion of the support pillow is secured to the pad along less than its complete arcuate dimension so that it has free sections. The free end portions disposed on the opposed ends of these free sections of the central portion, and the free end portions have their proximal ends secured to the central portion and terminate in free distal ends. Each of the free end portions is adjustably securable to the pad by a first pair of cooperative first and second fasteners adapted to releasably secure respective distal ends to the pad at respective outboard locations and a second pair of cooperative first and second fasteners adapted to releasably secure the respective proximal ends to the pad at respective inboard locations. Each of the first and second pair of cooperative fasteners includes a first fastener secured to a respective end portion and a second fastener secured to the pad, whereby the first fastener of each second pair of cooperative fasteners is matably securable to the second fastener of each first pair of cooperative fasteners to allow size of the region to the be altered. It is preferred that the first pair of cooperative fasteners be located at respective junctures at the lateral side edges and medial edges and that the second pair of cooperative fasteners be located at respective junctures of the medial edges and peripheral edge.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

Figures 1, 2:
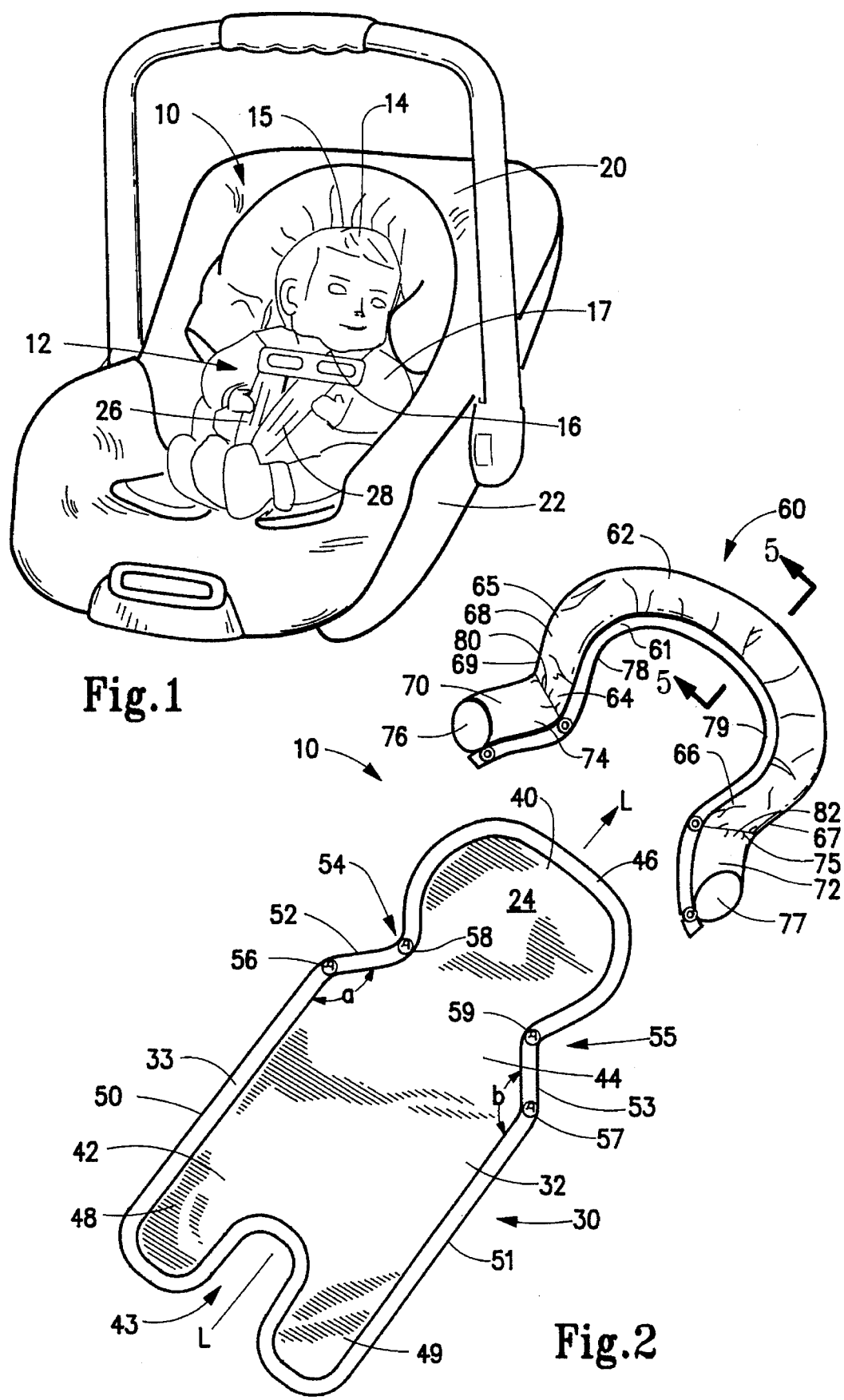
FIG. 1 is a perspective view of an exemplary embodiment of a support article of the present invention placed against a support structure in the form of an infant carrier with an infant placed therein in a reposed position.
FIG. 2 is an exploded perspective view of the support article of FIG. 1 showing both the pad and the support pillow.

The support article of the present invention is adapted to engage an infant's head, neck nd shoulders in order to provide stability to the infant's head and neck when the when the infant is placed thereon against a support. One of ordinary skilled in the art would appreciate that there are numerous types of supports which may be used. By way of example only, a support in the form of an infant carrier is employed for the description of the exemplary embodiment.

Furthermore, while the support article of the present invention is illustrated with reference to an infant being placed thereon in a seated position, it should be understood that the article is equally well suited for situations in which the infant is reclined against a support. Thus, the present invention is described in the context of an infant in a reposed position in order to contemplate all states of repose.

An exemplary embodiment of an infant support article 10 of the present invention is introduced in FIGS. 1–8. Support article 10 is adapted to support an infant against a support surface 20 of a support structure 22 such as the seat backing of a conventional infant carrier. Of course, it should be understood that the present invention may be used in conjunction with other types of support structures such as car seats, strollers, swings, or the like. An important feature of support device 10 is its ability to provide cushioned stability to the head 14, neck 16 and shoulders 17 of infant 12. Support article 10 is sized and adapted so that infant 12 can be placed thereon in a reposed state, such as the semi-reclined reposed position of FIG. 1.

Figure 3:
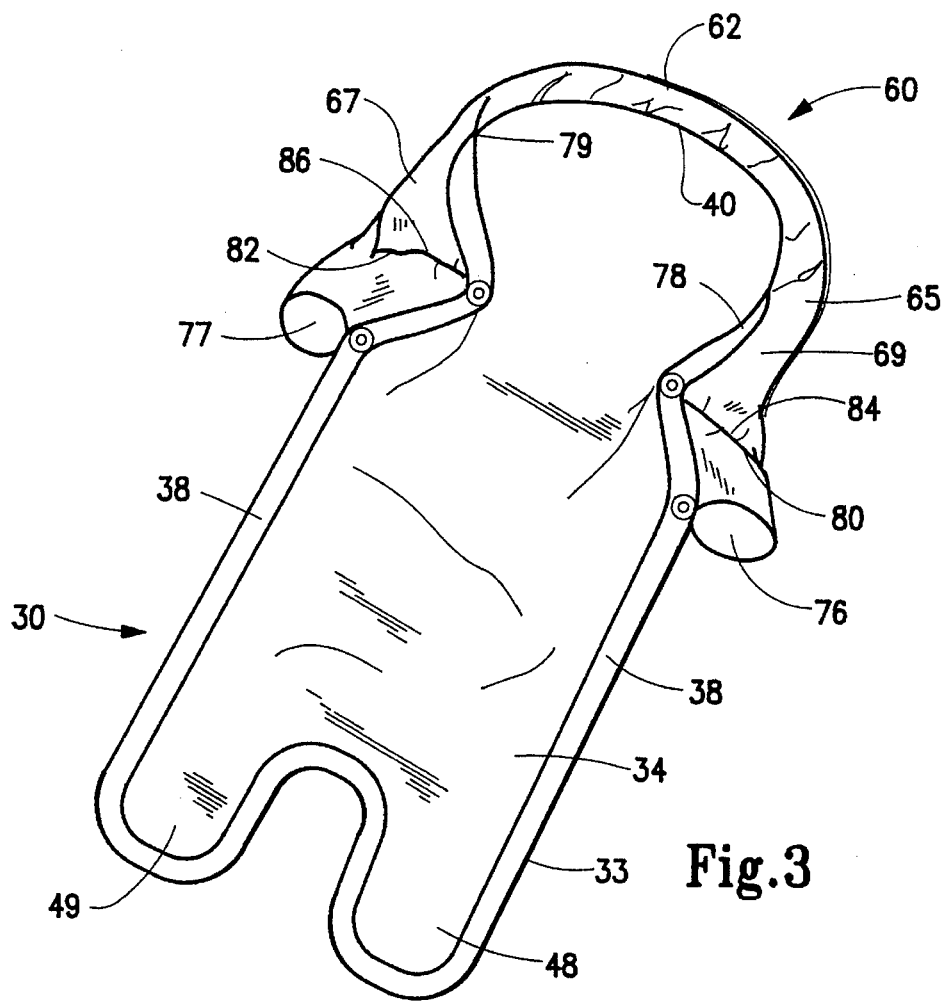
FIG. 3 is a perspective view of the back of the support article according to the exemplary embodiment of the present invention.
Figure 4:
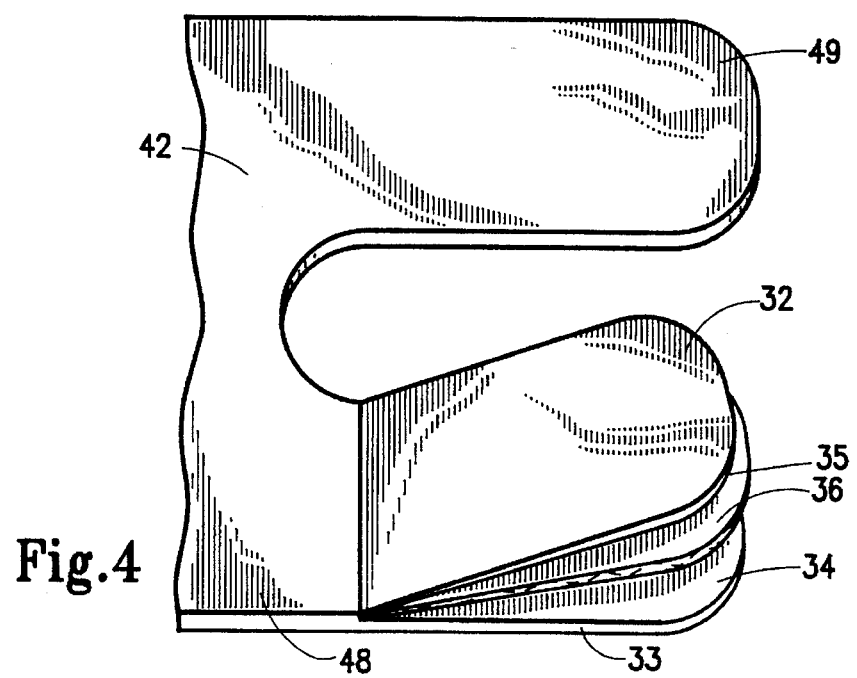
FIG. 4 is a perspective view of the lower portion of the pad used to form the support article showing the quilted layer of material disposed between its surfaces.

Support device 10 includes a pad 30 and an upstanding support pillow 60 as best shown in FIGS. 2 and 3. Pad 30 has a periphery 33 and includes a first surface 32 and a second surface 34. Pad 30 includes a curved upper portion 40, formed by an upper peripheral edge 46, and a lower portion 42, which is defined by a pair of lateral side edges 50 and 51 which are parallel to a longitudinal axis "L" shown in FIG. 2. Peripheral edge 46 extends in a circular fashion less than a full circle, and terminates in peripheral edge ends 58, 59 that are laterally inward of side edges 50 and 51. In the preferred embodiment of the present invention, lower portion 42 is formed as a pair of spaced apart leg regions 48 and 49 separated by a gap 43. Leg regions 48 and 49 are sized to accommodate the infant's legs thereon. As shown in FIG. 4, pad 30 may include a quilted layer 36 disposed between bottom layer 33 and a top layer 35. Layers 33 and 35 are further joined by a seam 38 located along periphery 33.

Upper portion 40 is connected to lower portion 42 by respective laterally extending medial edges 52 and 53 which define a medial portion 44 of first surface 32. Medial edges 52 and 53 are formed at obtuse angles "a" and "b", respectively, relative to their associated side edges 50, 51 and interconnect to edge ends 58, 59, respectively. Thus, a pair of opposed V-shaped cut-outs 54 and 55 are formed along the lateral sides of support article 10 so that medial portion 44 has a reduced transverse dimension relative to upper portion 40 and lower portion 42.

An upstanding support pillow 60 includes a central portion 62 and a pair of free end portions 70 and 72. Here, support pillow 60 is shown as an elongated tubular member, but other types of construction of support pillow 60 can certainly be utilized. Central portion 62 is configured as an arcuate member having a curvature which follows that of curved upper portion 40 of pad 30. Thus, central portion 62 extends around an open region 24 that is sized and adapted to receive the infant's head 14 when infant 12 is in a reposed position. End portions 70 and 72 are respectively connected to opposed ends 64 and 66 of central portion 62 and diverge from central portion 62 in laterally outward directions to define shoulder supports which rest against the infant's shoulders 17 and 18. The combination of end portions 70 and 72 and central portion 62 thus provide cushioned stability to the head 14 and neck 16 of infant 12 by resisting lateral movement. At juncture locations between end portions 70 and 72 and opposed ends 64 and 66 are a pair of hinge structures 80 an 82. These may be formed by affixing opposite sides 68 and 69 of said support pillow 60 together to form hinge lines such as by sewing.

Figure 5:
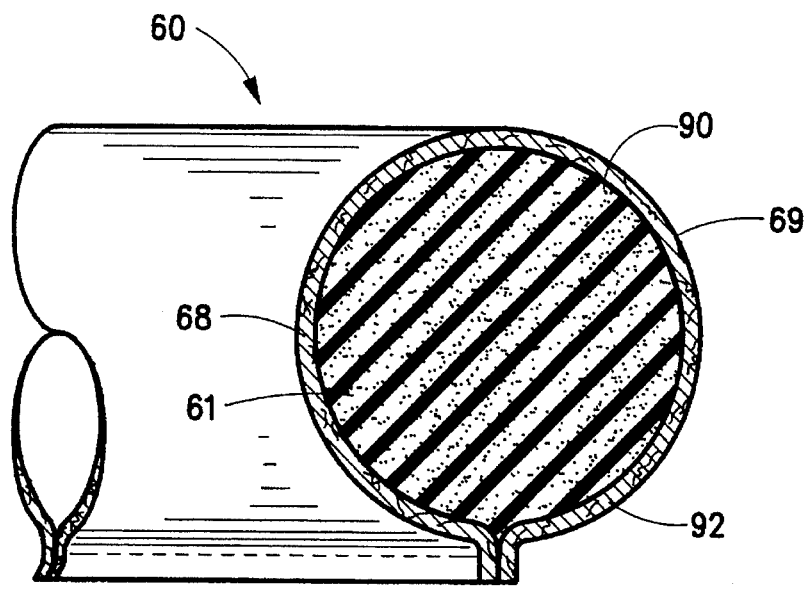
FIG. 5 is a cross-sectional view of the support pillow as taken along line 5—5 of FIG. 2.

As best shown in the cross-sectional view of FIG. 5, support pillow 60 is formed of a resilient material encased by fabric shell 92. While various types of resilient material can be utilized to form support pillow 60, it has been found that a flame retardant material is best for reasons of safety, and this material may be a polyester fiber, polyurethane foam, or such similar material. FIG. 5 also shows that support pillow 60 has a circular cross-section 61 to give it a substantially uniform height throughout. Unlike some existing infant head support devices which have their support pillows gradually taper from a maximum cross-sectional width in the top region 15 of the infant's head to their minimal width toward the upper torso, this feature provides greater cushioning support to the head, neck and shoulders of infant 12 so that lateral movement of the infant's head 14 is resisted when the child is placed on support article 10 in a reposed position. This better prevents the chance of unnecessary injury to infant 12.

Figure 6:
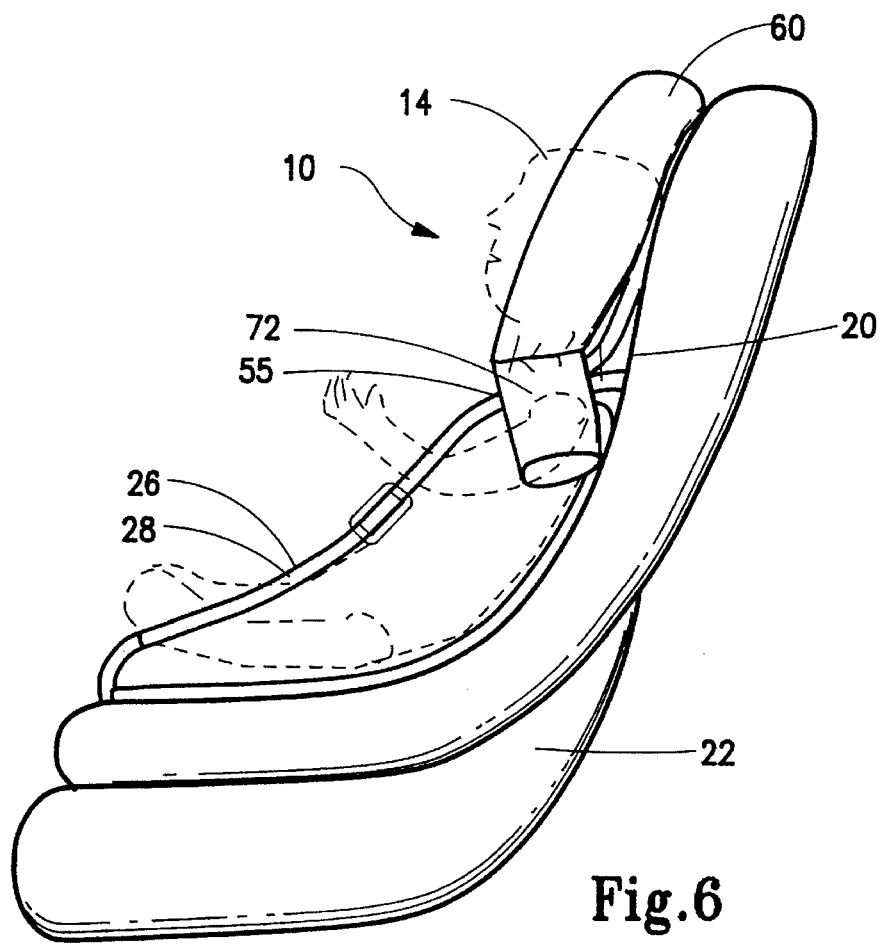
FIG. 6 is a side view in elevation of the support device according to the exemplary embodiment of the present invention as used in conjunction with the infant carrier of FIG. 1.
Figure 7:
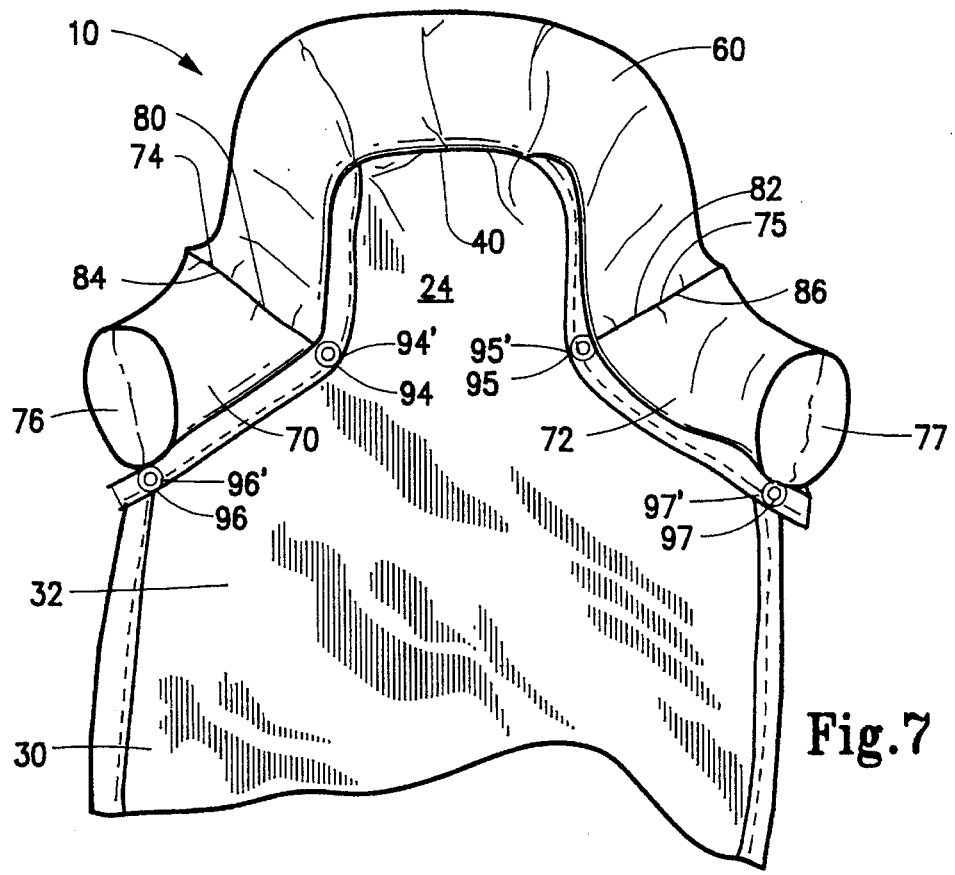
FIG. 7 is a front view in elevation of the support article according to the present invention showing the support pillow mounted on the pad in a first portion.
Figure 8:
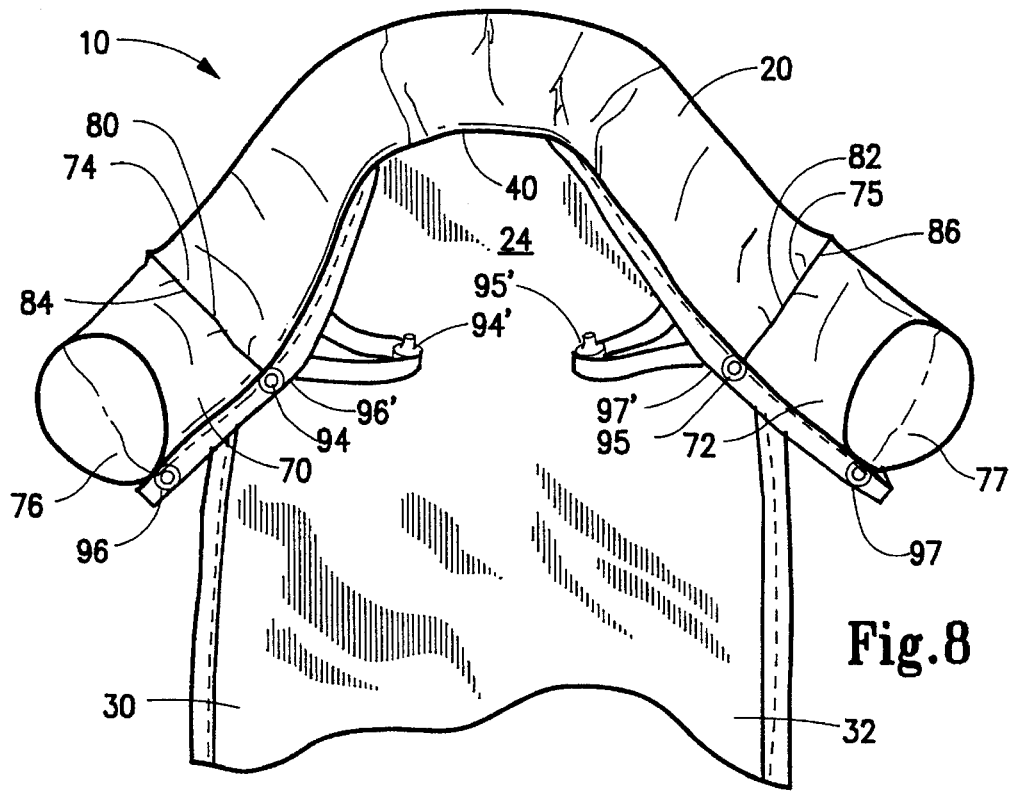
FIG. 8 is a front view in elevation of the support article showing the support pillow mounted on the pad in a second position.

Support pillow 60 is secured to pad 30 along a bottom margin 61 which can be a hem formed when material 90 is encased in fabric shell 92. Preferably, only part of central portion 62 is actually attached to pad 30 so that pillow 60 has unattached or free end sections 65 and 67 which extend from hinge structures 80, 82 and the locations of attachment of the central portion 62 as designated at 78 and 79, respectively. Thus, central portion 62 is affixed to pad 30 continuously along the peripheral edge 46 between points 78 and 79. This allows the remaining portions of support pillow 60 to be releasably securable to first surface 32 by a plurality of cooperative fasteners, as best shown in FIGS. 7 and 8. These cooperative fasteners serve a dual function. First, they allow support article 10 to be secured to support 20 of support structure 22. This is an important need because most infant carrier devices require certain safety standards to be met while the infant is being transported. In this embodiment, this safety feature is shown in FIGS. 1 and 6 by restraining straps 26 and 28 attached to support 20. By securing only part of central portion 62 of support pillow 60 to pad 30, it is relatively easy to remove the adjustable connectors to allow restraining straps 26 and 28 to be fed through the cut-outs 54 and 55.

A second, heretofore unrecognized, benefit of the present construction is to allow the size of region 24 to be changed so that the support device 10 may be adjusted to the size of the infant's head 14 as the infant grows. FIG. 7 shows a first position of support pillow 60 and pad 30 which is useful when the infant is only a few weeks old. In this configuration, the size of region 24 is relatively small so that elongated support pillow 60 provides a close cushioned support to the infant's head 14, neck 16 and shoulders 17. It may be seen that each of free end portions 70 and 72 has a proximal end 74 and 75 respectively, located near its associated hinged structure, 80 or 82. These proximal ends are connected to inboard locations on the first surface 32 by a pair of cooperative first and second fasteners 94 and 95. These cooperative fasteners allow proximal ends 74 and 75 to be releasably secured to the first surface 32 at these inboard locations. Another pair of cooperative first and second fasteners 96 and 97 are disposed along distal ends, 76 and 77 respectively, of free end portions 70 and 72. These cooperative first and second fasteners are adapted to releasably secure the distal ends of support pillow 60 to first surface 32 at outboard locations thereof.

As infant 12 grows, however, it becomes necessary to increase the size of region 24 so that support article 10 may comfortably accommodate yet protect, infant 12 thereon. This second position is depicted in FIG. 8 where it may be seen that support pillow 60 is adjustably secured to pad 30 by securing first ones 94' and 95' of the first pair of cooperative fasteners to the second ones 96' and 97' of the second pair of cooperative fasteners at the outboard locations. Thus, support pillow 60 is no longer secured to first surface at inboard locations and distal ends 76 and 77 of free end portions 70 and 72 are also unsecured. This permits the separation between end portions 70 and 72 to increase as they flare laterally outwardly a greater distance by virtue of the outboard locations. At the same time, the size of region 24 is also greater along the curved upper portion 40 of pad 30 to accommodate the infant's head size.

It should be understood, or course, that the adjustability of the present invention should not be limited to two-stages. Rather, the invention contemplates that the size of region 24 may be increased or decreased in discrete amounts by employing additional releasable connectors. Moreover, while the figures illustrate cooperating fasteners in the form of male and female snap members, it should be understood by one of ordinary skill in the art that other types of releasable connectors, such as Velcro® or structure equivalents thereof may be employed.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A support article adapted to engage an infant's head, neck and shoulders in order to provide lateral stability to the infant's head and neck, comprising:

(a) a pad adapted to be placed against a support, said pad having a first surface upon which said infant can be placed in a reposed position and a second surface opposite said first surface; and (b) an upstanding support pillow secured to said pad and including a central portion extending in an arcuate configuration around a region that is sized and adapted to receive the infant's head when said infant is in the reposed position and a pair of end portions disposed on opposed ends of said central portion and projecting in laterally outward directions from one another thereby to define shoulder supports that are positionable against the infant's shoulders when the infant's head is received within said region, said end portions adapted to be supported by the infant's shoulders and said end portions and said central portion operative to provide stability to the head and neck of said infant by resisting lateral movement of said infant when said infant is in the reposed position.

2. A support article according to claim 1 wherein a juncture of each of said end portions with said central portion is defined by a hinge structure located in a spaced relation to a respective end of said support pillow.

3. A support article according to claim 2 wherein each said hinge structure is formed by affixing opposite sides of said support pillow together along a hinge line.

4. A support article according to claim 1 wherein said support pillow is formed of a flame retardant material encased by fabric.

5. A support article according to claim 4 wherein said flame retardant material is selected from a group consisting of polyester fiber and polyurethane foam.

6. A support article according to claim 1 wherein said pad includes a curved upper portion formed by an upper peripheral edge and a lower portion and wherein said support pillow is an elongated tubular member disposed along said upper peripheral edge.

7. A support article according to claim 6 wherein said lower portion is formed as a pair of spaced apart leg regions.

8. A support article according to claim 1 wherein said support pillow has a substantially uniform height relative to said pad.

9. A support article according to claim 1 wherein each of said end portions projects at an obtuse angle from a respective end of said central portion.

10. A support article adapted to engage an infant's head, neck and shoulders in an adjustable manner thereby to provide lateral stability to the infant's head and neck during growth of the infant comprising:

(a) a pad adapted to be placed on a support, said pad having a first surface upon which said infant can be placed in a reposed position and a second surface opposite said first surface;

(b) a support pillow disposed on said pad and including an arcuate central portion which is secured to said pad along less than its complete arcuate dimension, said central portion extending around a region sized and adapted to receive the infant's head when the infant is in the reposed position so that movement of said head within said region is restricted and said head is maintained in an upright position, and a free end portion disposed on opposed ends of said central portion, each said free end portion having a proximal end secured to said central portions and terminating in a free distal end; and (c) a first pair of cooperative first and second fasteners adapted to releasably secure each said distal end to said pad at respective outboard locations and a second pair of cooperative first and second fasteners adapted to releasably secure each said proximal end to said pad at respective inboard locations.

11. A support article according to claim 10 wherein each of said first and second pair of cooperative fasteners includes a first fastener secured to a respective said end portion and a second fastener secured to said pad whereby the first fastener of each said second pair of cooperative fasteners is matably securable to the second fastener of each said first pair of cooperative fasteners to allow size of said region to be altered.

12. A support article according to claim 10 wherein said support pillow is an elongated tubular member formed of a flame retardant material encased by fabric.

13. A support article according to claim 10 wherein said pad is elongated and has a pair of spaced apart leg regions formed at a lower portion thereof.

14. A support article according to claim 10 including a quilted layer disposed between said first surface and said second surface.

15. A support article adapted to engage an infant's head, neck and shoulders in order to provide lateral stability to the infant's head and neck, comprising:

(a) an elongated pad having a longitudinal axis and adapted to be positioned against a support and having a first surface upon which said infant can be placed in a reposed position, said pad including a lower portion having a pair of lateral side edges and an upper portion having an upper peripheral edge extending arcuately around a majority of a circle and terminating at peripheral edge ends located laterally inwardly of said lateral side edges, said side edges respectively connected to the peripheral edge ends of said upper peripheral edge by respective inwardly extending medial edges each formed at an obtuse angle with respect to an associated one of said side edges such that said upper peripheral edge and said medial edges form a pair of opposed V-shaped cut-outs which define a medial portion of said pad between said upper portion and said lower portion with said medial portion being of reduced transverse dimension with respect thereto; and (b) a raised support pillow disposed on said pad alongside the upper peripheral edge to terminate proximate to said medial portion, said support pillow including a central portion extending in an arcuate configuration around a region that is sized and adapted to receive the infant's head when said infant is in the reposed position and a pair of end portions disposed on opposed ends of said central portion and projecting in laterally outward directions from one another thereby to define shoulder supports that are positionable against the infant's shoulders when the infant's head is received within said region, said end portions adapted to be supported by the infant's shoulders and said end portions and said central portion operative to provide stability to the head and neck of said infant by resisting lateral movement of said infant when said infant is in the reposed position.

16. A support article according to claim 15 wherein a central portion of said support pillow is secured to said pad.

17. A support article according to claim 15 including a first pair of cooperative fasteners located at respective junctures of said lateral side edges and said medial edges and a second pair of cooperative fasteners located at respective junctures of said medial edges and said peripheral edge, said first pair of cooperative fasteners and said second pair of cooperative fasteners adapted to releasably secure said support pillow to said pad.

18. A support article according to claim 15 including a second surface opposite said first surface and joined to said first surface by a seam.

19. A support article according to claim 18 including a quilted layer disposed between said first surface and said second surface.

20. A support article according to claim 15 wherein said lower portion is formed as a pair of spaced apart leg regions.

21. A support article according to claim 15 wherein said lateral side edges are each parallel to the longitudinal axis.

* * * * *